US010740699B2

(12) United States Patent
Flotat et al.

(10) Patent No.: US 10,740,699 B2
(45) Date of Patent: Aug. 11, 2020

(54) SYSTEM AND METHOD FOR SPECIALIZING TRANSACTIONS ACCORDING TO THE SERVICE PROVIDER

(71) Applicant: Conduent Business Services, LLC, Dallas, TX (US)

(72) Inventors: Denis Flotat, Bourg-lès-Valence (FR); Remi Feuillette, Valence (FR); Jean-Pierre Chichignoud, Saint-Péray (FR); Pascal Roux, Chabeuil (FR); Denis Letourneau, Guilherand-Granges (FR); Gregory Michiel, Chabeuil (FR); Cédric Chapignac, Upie (FR)

(73) Assignee: Conduent Business Services, LLC, Dallas, TX (US)

( * ) Notice: Subject to any disclaimer, the term of this patent is extended or adjusted under 35 U.S.C. 154(b) by 767 days.

(21) Appl. No.: 15/214,621

(22) Filed: Jul. 20, 2016

(65) Prior Publication Data
US 2018/0025293 A1 Jan. 25, 2018

(51) Int. Cl.
*G06Q 20/32* (2012.01)
*G06Q 10/02* (2012.01)
(Continued)

(52) U.S. Cl.
CPC ........... *G06Q 10/02* (2013.01); *G06Q 20/322* (2013.01); *G06Q 20/3224* (2013.01);
(Continued)

(58) Field of Classification Search
CPC .............. G06Q 10/02; G06Q 20/3224; G06Q 20/3278; G06Q 20/322; G06Q 20/356; G06Q 50/30; G07B 15/00; H04W 4/80
See application file for complete search history.

(56) References Cited

U.S. PATENT DOCUMENTS

| | | |
|---|---|---|
| 6,671,737 B1 | 12/2003 | Snowdon et al. |
| 2005/0222961 A1* | 10/2005 | Staib .................. H04M 1/0254 705/64 |

(Continued)

OTHER PUBLICATIONS

Li. Bai, G. Kane and P. Lyons, "Open architecture for contactless smartcard-based portable electronic payment systems," 2008 IEEE International Conference on Automation Science and Engineering, Arlington, VA, 2008, pp. 715-719. (Year: 2008).*

(Continued)

*Primary Examiner* — Daniel Vetter
*Assistant Examiner* — Manal A. Alsamiri
(74) *Attorney, Agent, or Firm* — Fay Sharpe LLP (57) ABSTRACT

A method for enabling transactions on networks that deliver services to users includes communicating a transaction application and a respective user identifier to a mobile communication device via a wireless connection. A set of complementary modules is stored, remote from the mobile communication device. When one of the complementary module has been loaded on the user's mobile communication device, it enables the user of the device to specialize a transaction on at least one of the associated networks by selecting at least one variable of the transaction. Different complementary modules can be provided to the user's mobile communication device for specializing transactions on other service provider networks.

21 Claims, 6 Drawing Sheets

(51) Int. Cl.
*G06Q 20/34* (2012.01)
*H04W 4/80* (2018.01)
*G06Q 50/30* (2012.01)
*G07B 15/00* (2011.01)

(52) U.S. Cl.
CPC ....... *G06Q 20/3278* (2013.01); *G06Q 20/356* (2013.01); *G06Q 50/30* (2013.01); *G07B 15/00* (2013.01); *H04W 4/80* (2018.02)

(56) References Cited

U.S. PATENT DOCUMENTS

| | | | | |
|---|---|---|---|---|
| 2008/0201212 | A1* | 8/2008 | Hammad | G07F 17/42 |
| | | | | 705/13 |
| 2009/0283591 | A1 | 11/2009 | Silbernagl | |
| 2012/0109722 | A1* | 5/2012 | Saunders | G07B 15/02 |
| | | | | 705/13 |
| 2012/0234914 | A1 | 9/2012 | Roux | |
| 2013/0030964 | A1* | 1/2013 | Nuzzi | G06Q 30/04 |
| | | | | 705/30 |
| 2013/0185324 | A1 | 7/2013 | Bouchard et al. | |
| 2013/0317742 | A1 | 11/2013 | Ulloa Paredes et al. | |
| 2013/0317747 | A1 | 11/2013 | Chidlovskii et al. | |
| 2013/0317884 | A1 | 11/2013 | Chidlovskii | |
| 2014/0089036 | A1 | 3/2014 | Chidlovskii | |
| 2014/0201066 | A1* | 7/2014 | Roux | G06Q 20/3227 |
| | | | | 705/39 |
| 2014/0207538 | A1* | 7/2014 | Jin | G06Q 20/045 |
| | | | | 705/13 |
| 2016/0033283 | A1 | 2/2016 | Ulloa Paredes | |

OTHER PUBLICATIONS

Pelletier, Marie-Pier, et al. "Smart Card Data Use in Public Transit: A Literature Review." Transportation Research Part C: Emerging Technologies, Pergamon, Jan. 7, 2011, www.sciencedirect.com/science/article/pii/S0968090X1000166X. (Year: 2011).*

U.S. Appl. No. 14/737,964, filed Jun. 12, 2015, Ulloa Paredes, et al.

U.S. Appl. No. 15/000,299, filed Jan. 19, 2016, Feuillette, et al.

* cited by examiner

SYSTEM AND METHOD FOR SPECIALIZING TRANSACTIONS ACCORDING TO THE SERVICE PROVIDER

BACKGROUND

The exemplary embodiment relates to public transportation and finds particular application in connection with a system and method for specializing transactions for different service providers.

In conventional public transportation systems, travelers pay for a trip and receive a single or multi-journey ticket which is used to verify that the traveler has paid for the trip. Prepaid tickets can be paper, magnetic or contactless cards or tickets. Such solutions often require substantial investments in infrastructure, including ticket readers, ticket dispensers, and recharging stations. Additionally, the use of tickets can cause delays in boarding of a bus at a busy stop, as each traveler takes time to provide exact change for a ticket or scans a pre-purchased ticket for validation.

More recently, systems have been developed which allow travelers to pay for trips using smart phones which interact with a smart tag located on a transportation vehicle or at one of the stops. The passenger taps the phone on the tag at boarding and/or alighting locations. To minimize the cost of the tags, information on the transactions is sent by the travelers' phones to a central server where invoicing functions are performed. The tag provides the phone with information that is used by the server to compute the price of the trip. The trip price is often based on the boarding and alighting locations and time. One problem with this approach is that passengers sometimes forget to tap on alighting, and are thus charged the maximum fare for the route. Additionally, the system does not facilitate different fare structures, such as reduced rates for families, students, and so forth. Further, since the passenger is not charged until the journey is complete, the approach is not well-suited to long-distance routes, where the service provider may desire to receive payment in advance.

Thus, it would advantageous to provide a system and method for providing the passenger with a method for specializing a transaction at the start of the journey.

INCORPORATION BY REFERENCE

The following references, the disclosures of which are incorporated herein in their entireties, by reference, are mentioned:

U.S. Pub. No. 20090283591, published Nov. 19, 2009, entitled PUBLIC TRANSIT SYSTEM FARE PROCESSOR FOR TRANSFERS, by Martin Silbernagl.

U.S. Pub. No. 20120234914, published Sep. 20, 2012, entitled SYSTEM AND METHOD FOR VALIDATING THAT FARES HAVE BEEN PAID, by Pascal Roux.

U.S. Pub. No. 20130185324, published Jul. 18, 2013, entitled LOCATION-TYPE TAGGING USING COLLECTED TRAVELER DATA, by Guillaume M. Bouchard, et al.

U.S. Pub. No. 20130317742, published Nov. 28, 2013, entitled SYSTEM AND METHOD FOR ESTIMATING ORIGINS AND DESTINATIONS FROM IDENTIFIED END-POINT TIME-LOCATION STAMPS, by Luis Rafael Ulloa Paredes, et al.

U.S. Pub. No. 20130317747, published Nov. 28, 2013, entitled SYSTEM AND METHOD FOR TRIP PLAN CROWDSOURCING USING AUTOMATIC FARE COLLECTION DATA, by Boris Chidlovskii, et al.

U.S. Pub. No. 20130317884, published Nov. 28, 2013, entitled SYSTEM AND METHOD FOR ESTIMATING A DYNAMIC ORIGIN-DESTINATION MATRIX, by Boris Chidlovskii.

U.S. Pub. No. 20140089036, published Mar. 27, 2014, entitled DYNAMIC CITY ZONING FOR UNDERSTANDING PASSENGER TRAVEL DEMAND, by Boris Chidlovskii.

U.S. Pub. No. 20140201066, published Jul. 17, 2014, entitled SYSTEM AND METHOD FOR ENABLING TRANSACTIONS ON AN ASSOCIATED NETWORK, by Pascal Roux, et al.

U.S. Pub. No. 20160033283, published Feb. 4, 2016, entitled EFFICIENT ROUTE PLANNING IN PUBLIC TRANSPORTATION NETWORKS, by Luis Rafael Ulloa Paredes.

U.S. Pat. No. 6,671,737, issued Dec. 30, 2003, entitled DECENTRALIZED NETWORK SYSTEM, by Dave Snowdon, et al.

U.S. application Ser. No. 14/737,964, filed Jun. 12, 2015, entitled LEARNING MOBILITY USER CHOICE AND DEMAND MODELS FROM PUBLIC TRANSPORT FARE COLLECTION DATA, by Luis Rafael Ulloa Paredes, et al.

U.S. application Ser. No. 15/000,299, filed Jan. 19, 2016, entitled LOCALIZATION OF TRANSACTION TAGS, by Remi Feuillette, et al.

BRIEF DESCRIPTION

In accordance with one aspect of the exemplary embodiment, a method for enabling transactions on a plurality of associated networks delivering services to users is provided. The method includes communicating a transaction application and a respective user identifier to at least one mobile communication device via a wireless connection. A set of complementary modules is stored, remote from the mobile communication device. Each complementary module enables a user with a transaction application and user identifier on a respective one of the mobile communication devices to specialize a transaction on at least one of the associated networks by selecting at least one variable of the transaction, when the complementary module has been loaded on the user's device. One of the set of complementary modules is provided to the user's mobile communication device for specializing a transaction on a selected one of the associated networks.

One or more of the steps of the method may be performed with a processor.

In accordance with another aspect of the exemplary embodiment, a system for enabling transactions on a plurality of associated networks delivering services to users is provided. The system includes a registration component for communicating a transaction application and a respective user identifier to mobile communication devices via a wireless connection. The transaction application enables users to conduct transactions for services on the networks. At least one of the networks is associated with a complementary module for specializing transactions on the network. Memory stores a set of the complementary modules. Each complementary module enables a user with a transaction application and user identifier on a respective one of the mobile communication devices to specialize a transaction on a respective one of the associated networks by selecting at least one variable of the transaction. A complementary module provider provides one of the set of complementary modules to the user's mobile communication device for specializing a transaction on a user-selected one of the associated networks. A processor implements the registration component and complementary module provider.

In accordance with another aspect of the exemplary embodiment, a method for specializing a transaction for delivering a service to a user with a mobile communication device includes, with a transaction application on the mobile communication device, determining that a service provider of a transportation service is associated with a complementary module that is not stored on the mobile communication device. The method further includes downloading the complementary module onto the mobile communication device via a wireless connection and, with the transaction application, generating a graphical user interface which enables a user to specialize a transaction by selection from a set of variables provided by the complementary module. When the mobile communication device is within communication range of an automatic ticketing validation device on a transportation vehicle, validation data for the transaction is received from the automatic ticketing validation device. The validation data is relayed from the mobile communication device to a transaction server to specialize the transaction based on the selection from the set of variables.

One or more of the steps of the method may be performed with a processor.

BRIEF DESCRIPTION OF THE DRAWINGS

FIG. 5, which is split into

DETAILED DESCRIPTION

Aspects of the exemplary embodiment relate to a system and method for enabling transactions on a set of networks that provide services to users. The exemplary networks are transportation networks which deliver transportation services to users. The user conducts a transaction for a service using a transaction application and a respective user identifier on the user's mobile communication device. Some services require or provide the option of specializing the service. Because different networks allow for different specializations, a set of complementary modules is stored at a location remote from the mobile communication device. When downloaded onto a user device, each complementary module enables the user to specialize a transaction on at least one of the associated networks by selecting at least one variable of the transaction. The user's mobile device need only acquire the complementary modules for specializing transactions on the service providing network(s) used by the user.

Figure 1:
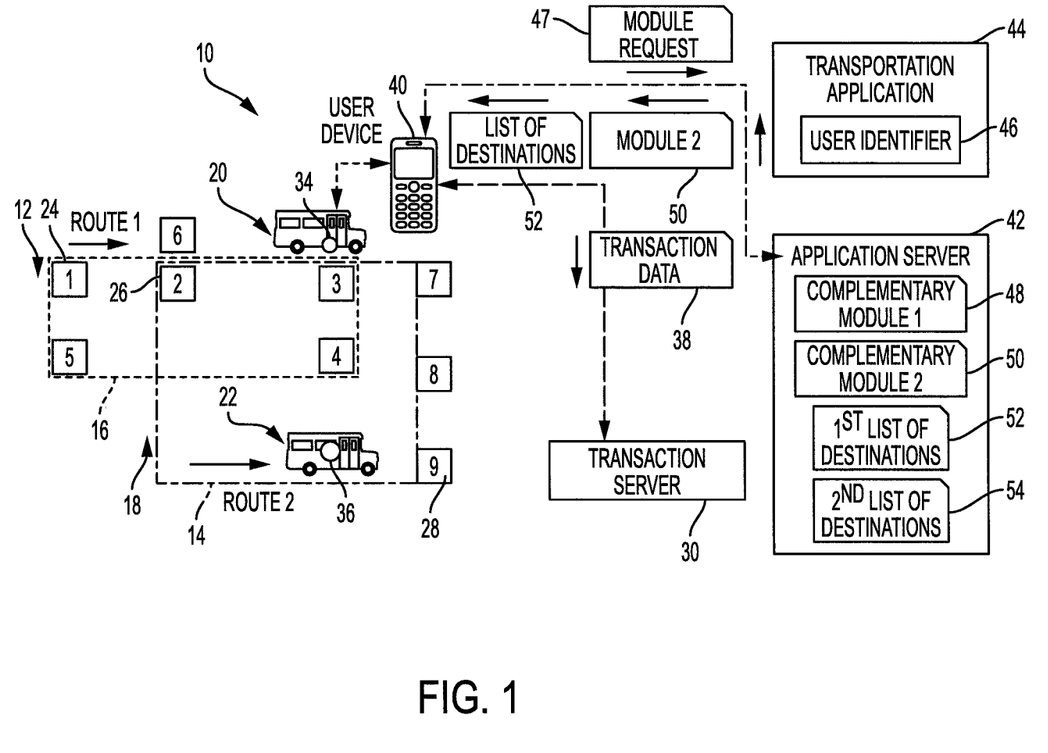
FIG. 1 is a functional block diagram of an environment in which a system for enabling transactions in accordance with one aspect of the exemplary embodiment operates.

With reference to FIG. 1, an illustrative transportation environment 10 includes a plurality of transportation networks 12, 14, etc., each with a set of one or more routes 16, 18, etc. In the exemplary embodiment the first network 12 is serviced by a first transportation provider and includes a first route 16 (Route 1) and the second network 14 is serviced by a second transportation provider and includes a second route 18 (Route 2). Each transportation network 12, 14 may be a bus, rail, tram, subway network, any other transportation mode, or may include a combination of different modes of transport.

Multiple public transport vehicles 20, 22, etc., such as buses or trams, travel on the different routes 16, 18, etc. according to predefined schedules, to provide transportation services that are utilized by a large number of users, which may be referred to as passengers or travelers. Each route may include a set of predetermined stops 24, 26, 28, etc. (such as bus stops or tram stops), at fixed locations on the route, where passengers can board or alight from a vehicle.

Each provider has its own arrangements for collecting fares from passengers on its routes. While one route is shown for each provider, it is to be appreciated that there may be multiple routes and the routes may be widely spaced, rather than overlapping, as shown. One or more transaction servers 30 collect information for transactions conducted on the provider(s)' routes.

Each transportation network 12, 14 includes a respective set of automatic ticketing validation (ATV) devices 34, 36, etc., such as RFID (Radio-frequency identification) transaction tags, that collect transaction data 38 for travelers. The ATV devices 34, 36 may each be associated with a respective one of the vehicles 20, 22, e.g., mounted in the passenger area of the vehicle or by the door where passengers enter or leave the vehicle, and or positioned at boarding and/or alighting locations, such as gates in subway or train stations. Some vehicles may be equipped with more than one ATV device. The transaction server 30 collects the information from the ATV devices for invoicing passengers for their trips. In the exemplary embodiment, transaction data 38 is relayed to the appropriate data processing server via the mobile communication devices 40 of passengers on the vehicles, as described, for example, in U.S. Pub. No. 20140201066 and/or U.S. application Ser. No. 15/000,299.

Passengers wishing to use their devices 40 for transactions on the transportation networks 12, 14 register with an application server 42, which allows them to download a transaction application 44 to their mobile devices as well as a user identifier 46, which uniquely identifies the passenger to the transaction server 30. The transaction application 44 enables the passengers to make transactions on one or more different transport networks 12, 14, but only for a subset of transactions which are generic to some or all of the transportation networks, such as short, single trip journeys for a basic one person fare in which the passenger validates the transaction at the beginning and end of the journey. In the event that a passenger wishes to make a specialized transaction that is not among the basic subset of transactions provided for by the transaction application 44, or where the network being used requires a complementary module for all transactions, the transaction application 44 sends a module request 47 to the application server 42, via the mobile device 40, which allows the passenger to download a complementary module 48 from a set of different complementary modules 48, 50, etc. to his or her mobile device 40, which is applicable to the transportation network. The passenger may also download a list 52, 54 of destinations which is specific to the network.

The complementary module, alone or in combination with the destination list 52 or 54, enables the user to specialize a transaction by selection from a set of variables for the transaction. Each selectable variable may have an influence on the cost of the transaction for the user, such as destination-dependent pricing. While two complementary modules are shown by way of illustration, it is to be appreciated that the application server may have any number of different complementary modules available for providing to users, such as 3, 4, 5, or more complementary modules 48, 50. Further, while two destination lists are shown by way of illustration, it is to be appreciated that the application server may have any number of different destination lists available for providing to users, such as 3, 4, 5, or more destination lists 52, 54.

The mobile device 40 of each passenger only needs to store complementary modules 48, 50 for the networks used by the passenger for specializing transactions and is able to download a new module and/or destination list 52 when needed. In some embodiments, the destination list may be a part of one or more of the complementary modules. In some embodiments, different networks may share the same complementary module but use different destination lists. In some embodiments, one or more of the complementary modules may not utilize a destination list. The complementary modules enable the passenger to specialize the transaction by selecting variables of the transaction, such as the destination (in conjunction with the destination list) and/or a fare structure. The destination list and/or complementary module may provide for the user to select other variables, such as a maximum number of adults in a group, a maximum number of children in a group, a maximum trip duration, a service provider logo (to be displayed on the GUI), and the like.

Figure 2:
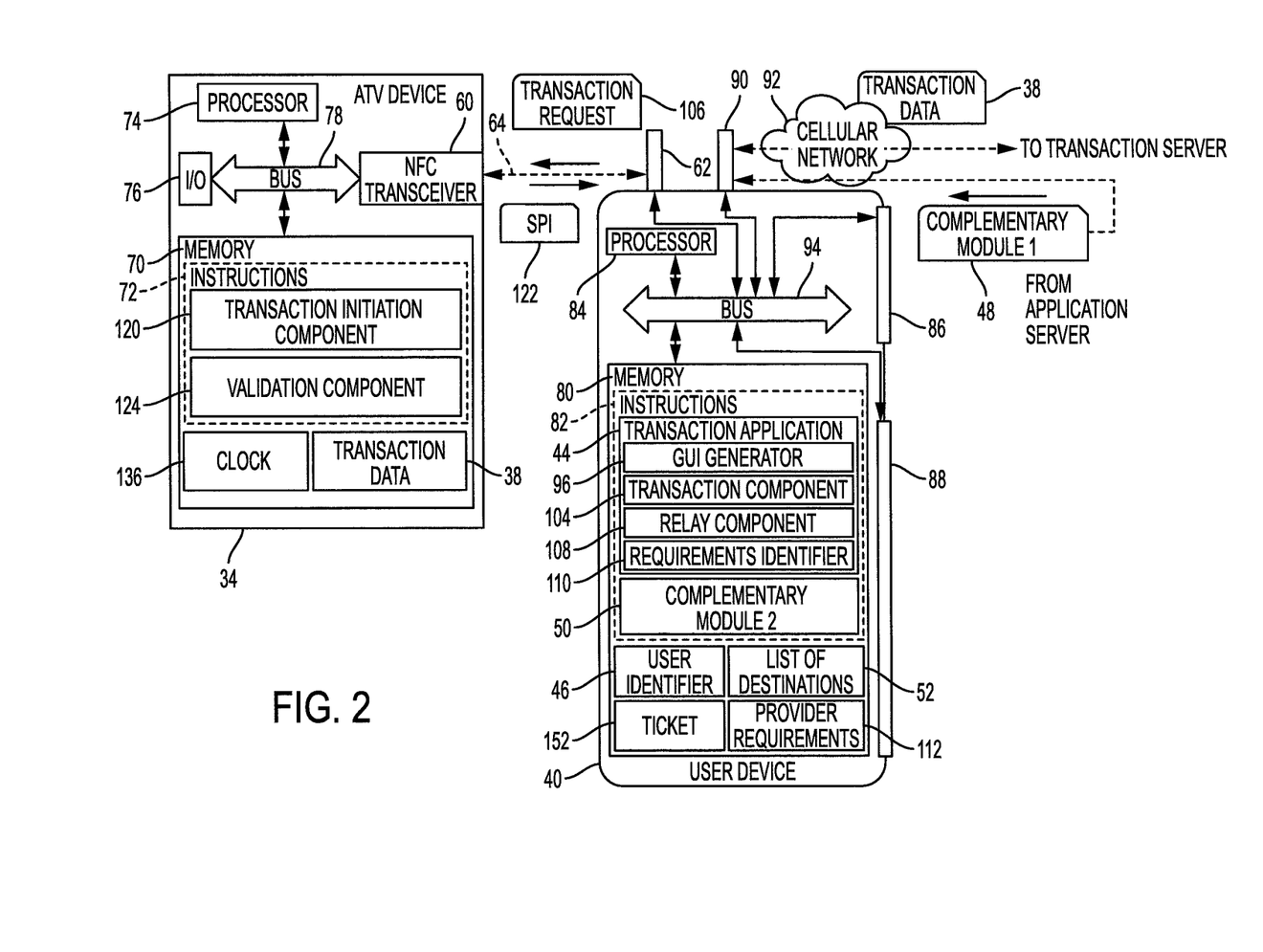
FIG. 2 illustrates an automatic ticketing validation device and a user device operating in the environment of FIG. 1.

With reference also to FIG. 2 (not to scale), each of the vehicles 20, etc. includes a respective ATV device 34 which includes a short range communication device 60, such as a near field communication transceiver, which communicates with a respective short range transceiver 62 of the mobile device 40 via near field communication 64, when the mobile device transceiver 62 is within range of the short range communication device 60.

The ATV device 34 includes memory 70, which stores instructions 72 for validating transactions and a processor 74 in communication with the memory for executing the instructions. Optionally, an input/output device 76 allows data transfers directly from the ATV device via a wired connection. Hardware components 70, 74, 60, 76 communicate via a data/control bus 78. The ATV device 34 may be a low powered (e.g., battery powered) RFID tag that is mounted to the vehicle, inside or outside.

The mobile device 40 includes memory 80, which stores instructions 82, including transaction application 44 for conducting transactions, and a processor 84 in communication with the memory for executing the instructions. The mobile device also includes a display device 86, for displaying information to users and a user input device 88, such as a touchscreen, keyboard, combination thereof, or the like. A long range communication device 90, enables the mobile device 40 to communicate with other devices, such as the servers 30, 42, over longer ranges than the communication device 62, e.g., via a cellular network 92. Hardware components 80, 84, 62, 86, 88, 90 communicate via a data/control bus 94.

Passengers each swipe the ATV device 34 to validate their trip, e.g., by touching the ATV device with their mobile device 40 or bringing the communication device within communication range of the ATV device, such as within 3-5 cm. In the exemplary embodiment, the mobile device 40 may be a smartphone which communicates with the transceiver 60 of the ATV device (or with separate emitter and receiver components). The mobile device 40 may be equipped with short range communication capability, e.g., Near Field Communication (NFC) or Bluetooth Low Energy (BLE) to send and receive signals to/from the transceiver 60. Near field communications is a set of standards for smartphones and similar portable user devices to establish radio communication with each other by touching them together or bringing them into close proximity, e.g., within a few centimeters. The short-range wireless technologies employed in NFC operations may require a distance of 10 cm or less, or about 5 cm or less. NFC employs an initiator and a target, with the initiator capable of actively generating an RF field that can power a passive target or communicate with an active target. RFID (e.g., NFC) tags may be read-only or rewriteable, and may be custom encoded. NFC tags may be configured to provide various communication speeds, memory, security, data storage, write endurance, etc. After mutual authentication between the mobile device 40 and the ATV device 34, 36, transactions are created and encrypted by the ATV device.

Figure 3:
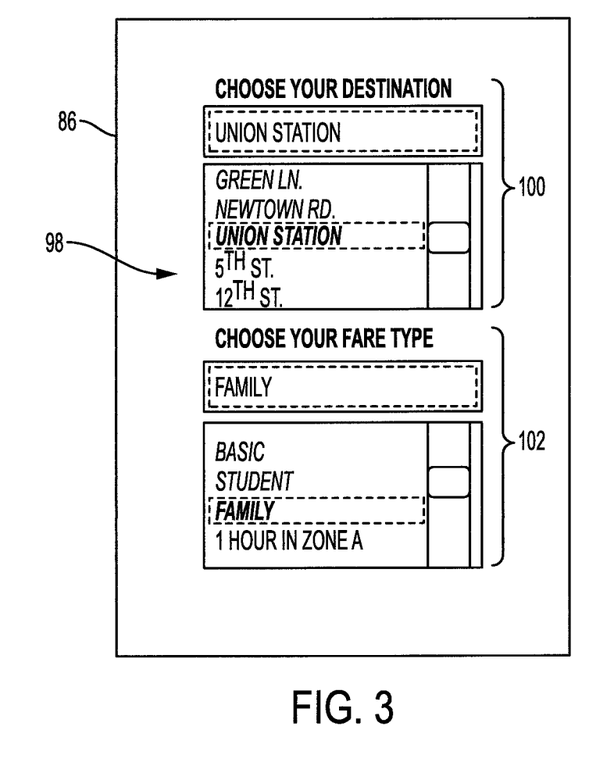
FIG. 3 illustrates a graphical user interface displayed on the user device of FIGS. 1 and 2.

The application 82 includes a GUI generator 96 for generating a respective graphical user interface (GUI) 98 on the display device 86. In cooperation with the complementary module 48, 50, etc., the transaction application 44 generates a GUI 98 which is applicable to the transportation network associated with the complementary module, as illustrated in FIG. 3. The GUI 98 displays user-selectable transaction variables, which vary, at least in some respects, from one transportation network to another. The GUI enables the user to specialize the transaction by selecting one or more of the variables. In one embodiment, the module may cause selectable destinations (e.g., a precise location or a zone including several locations) to be displayed in a destination selection region 100 of the GUI, or otherwise permit the user to select from a set of possible destinations applicable to the network, generated from the destinations list 52. In another embodiment, the module may cause selectable fare types to be displayed in a fare type selection region 102 of the GUI, or otherwise permit the user to select from a set of possible fare types applicable to the network. Exemplary fare types, may include one or more of student fare structure, a multi-person fare structure (e.g., for a family or a group of individuals traveling on the same journey), an age-related fare structure (e.g., a child fare or a senior person's fare), a time-dependent fare structure (e.g., for travel within a specified time period, such as one hour, optionally limited to a specific zone or zones), and the like. As will be appreciated, the fare types provided through the GUI are not limited to these specific types of transaction. In some embodiments, during registration, the passenger may be required to provide evidence of their status (e.g., age) for enabling one or more of the fare structures.

The application 82 further includes a transaction component 104 for conducting a transaction with the ATV device 34. The transaction component 104 submits the user identifier 46 and a transaction request 106 to the ATV device, generated from the user's selections on the GUI 98. The application 82 further includes a relay component 108 which relays transaction data 38 generated by the ATV device 34 to the transaction server 30. The relay component may relay transaction data 38 for a plurality of transactions, conducted by the ATV device 34 with a plurality of mobile communication devices 40, from the tag to the network's transaction server 30 for computing a payment for each transaction.

The transaction application 44 includes a requirements identifier 110, which determines what complementary module and/or destination list is required for the service provider, based on the service provider identifier (SPI) 122. In one embodiment, the requirements identifier 110 accesses a provider requirements table 112 (i.e., any suitable data structure) which specifies, for each service provider, if a complementary module is needed, its reference, and a reference of the destinations list, if needed. The requirements identifier 110 compares the listed requirements to what is currently on the mobile device and prompts the user to download any missing complementary module/destination list, or may automatically download them from the applications server 42, e.g., if mandatory. In another embodiment, the requirements identifier 110 sends the SPI 122 to the application server 42 which stores the table 112 and notifies the requirements identifier 110 what complementary module/destination list is/are needed, if any.

An example table 112 is shown in TABLE 1 below:

TABLE 1

| Service provider | Module Mandatory | Module reference | List reference |
|---|---|---|---|
| 1 | Yes | 10 (destination choice) | Destinations (stops) for city A |
| 2 | Yes | 12 (destination and fare choice) | Destinations (zones) for city B |
| 3 | No | 10 (destination choice) | Destinations (stops) for city C |
| 4 | Yes | 11 (fare choice) | none |
| 5 | No | none | none |

As can be seen from TABLE 1, service providers 1, 2, and 4 require that the appropriate complementary module be installed on the user's mobile device before a transaction can be initiated. Service provider 1 requires module reference 10 and a destination list for city A, which may be a list of vehicle stops, such as bus stops and/or stations. Service provider 2 requires module 12, which is different from module 10 since it also provides different fare choices, and a destination list for city B, which in this case is a list of zones, the fare being dependent on the originating and destination zones. Service provider 3 does not require a module, but if the user wishes to obtain reduced fares for some or all destinations, then a complementary module will be needed. Service provider 4 requires a complementary module for selecting fare type, but does not make use of a destination list since all destinations are the same price, given a selected fare type. Service provider 5 does not require a complementary module as all destinations are the same price and there are no different fare types.

The same complementary module 50 may be used by many networks having the same needs, with the following advantages:

1. same user interface for the user;
2. less memory used; and
3. better probability to already have it installed when using another service provider.

A single complementary module 50 (e.g., one offering a destination choice) may use a destination list which is different for each transportation network.

The use of the module before tapping on the ATV device may be mandatory (providers 1 and 2 above) or optional (provider 3 above); when optional, the user may tap without any pre-selection to get a "standard transaction" (e.g., in Paris, a single adult fare valid in Paris city only).

A complementary module (e.g. "Price choice") may use no list (provider 4 above).

When no complementary module is needed for any of the proposed fares, no module reference is entered in the list (provider 5 above).

Other embodiments are contemplated. For example, if a complementary module is required and not installed, the user may be blocked (mandatory module) or redirected to a basic transaction not using the module (optional module). In one embodiment, a (mandatory or optional) module may have an associated optional list of variables. If the optional list is not downloaded, the module may only offer basic transactions. The complementary module may allow the user to choose a destination from the downloaded list to obtain the right zone/fare, or the zone/fare may be known in advance in which case, the user may not need to download the destination list. In some embodiments, two or more complementary modules may be provided for a service provider, which each provide for different variables to be selected. For example, one module may allow the user to choose the zone while another may allow the user to select the number of adults and/or children up to maximum values specific to the network if the list is downloaded, or (lower) default maximum values if the list is not downloaded.

The transaction application 44 available for download may be regularly updated so that the table 112 lists the most common complementary modules used by affiliated transportation networks/service providers which require such a module for the user to preselect the correct fare/price.

In some embodiments, a complementary module previously downloaded may become out of date. If the module has been superseded by a newer complementary module, the user may be prompted to download the newer version, either during regular updates or when the user tries to use the outdated module for making a journey.

In some embodiments, the transaction application may include one or more default modules, analogous to complementary modules, which are known to be widely used by passengers.

In some embodiments, the complementary module 50 may include the destination list 52.

Figure 4:
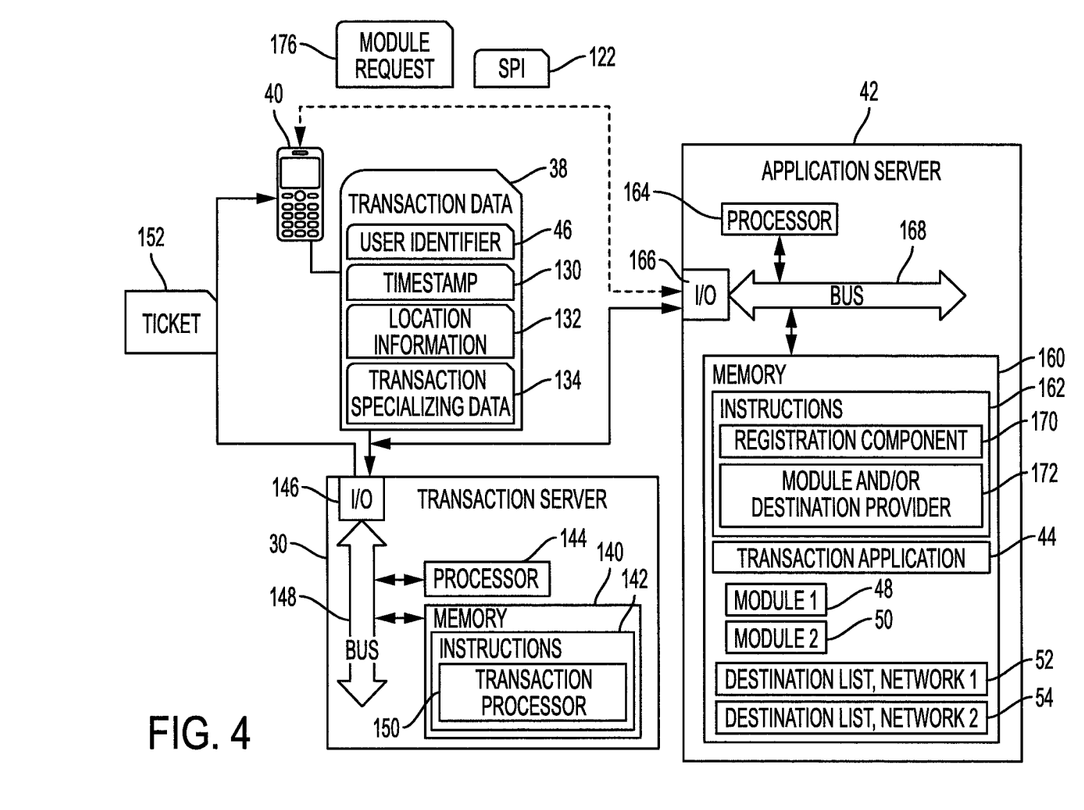
FIG. 4 illustrates communications between a user device, a transaction server, and an application server.

In the case of the ATV device 34, the instructions 72 include a transaction initiation component 120 which provides a service provider identifier (SPI) 122 to the mobile device 40, at the beginning of a transaction. Based on the service providers list 112 kept up to date in his or her mobile device 40, the user will be invited, if necessary, to download a missing complementary module (mandatory or optional as chosen by the service provider) and to preselect his or her destination (or to provide additional information on the service that is being purchased). Component 120 is not needed for ATV devices on networks that do not require a complementary module for any transaction. A validation component 124 generates transaction data 38 for each transaction. As illustrated in FIG. 4, the transaction data 38 may include the user identifier 46 of the respective passenger or other identifying information, a time stamp 130, location information 132, and (optionally, except in the case of a basic transaction) transaction specializing data 134 which is based on the transaction request 106. The time stamp 130 may be generated by a clock 136 in the ATV device 34. The location information 132 may be generated by a GPS location finder (not shown) in the ATV device 34 or based on location information sent to the ATV device 34 by beacons positioned along the route, as described, for example, in copending application. Ser. No. 15/000,299. The transaction data 38 is sent in encrypted form so that it is decipherable only by the appropriate transaction server, such as server 30 in the illustrated case.

The transaction server 30 includes memory 140, which stores instructions 142 for completing transactions and a processor 144 in communication with the memory for executing the instructions. An input/output device 146 allows the transaction server to communicate wirelessly with external devices, such as mobile devices 40. Hardware components 140, 144, 146 communicate via a data/control bus 148. The instructions include a transaction processor 150 which processes a transaction based on the transaction data 38, which may include computing a payment for the transaction, billing the passenger, and sending a ticket 152 to the mobile device 40 (except, optionally, in the case of a basic transaction). The ticket information can be communicated to the ATV device 34 when the mobile device is tapped on it at the destination and/or displayed on the mobile device by the passenger when asked to present a ticket to a ticket collector. In the case of a multi-trip ticket which allows the user to leave one vehicle and board another (e.g., within a specified time period), the ticket 152 can be used by the mobile device to generate a new transaction request 106 at each subsequent boarding.

The exemplary system finds application in variable price ticketing systems, with or without a default price, or systems offering any other service needing a choice on the part of the user, mandatory or optional if a default service exists.

As illustrated in FIG. 4, the application server 42, which is remote from the user's mobile device 40, includes memory 160, which stores a set of complementary modules 48, 50 and instructions 162 for providing modules. A processor 164 in communication with the memory executes the instructions. An input/output device 166 allows the application server to communicate wirelessly with external devices, such as mobile devices 40. Hardware components 160, 164, 166 communicate via a data/control bus 168. The instructions include a registration component 170 for registering new users and providing a transaction application 44 and unique user identifier for download to the user's mobile device 40. The instructions also include a complementary module and/or destination list provider 172 for delivering one of the set of complementary modules 48, 50 and/or one of the set of destination lists 52, 54, to the user's device 40. The user's device may specify the module/list in a request 176 or send the SPI 122 from which the provider component 172 determines the module and/or list needed. The provider component 172 provides the relevant complementary module 48, identified from the set of complementary modules, and/or the relevant destination list 52, identified from the set of destination lists, to the user device. The application server 42 can serve multiple user devices, e.g., providing another of the set of complementary modules to the same user's device or to another user's device for specializing transactions on another of the transportation networks.

Several situations are contemplated, depending on the service provider, the status of the mobile device 40, and/or the type of transaction desired by the user.

Case 1: In the case where the transaction application 44 in the mobile device 40 already includes or has access to the complementary module 48, 50 for the desired service provider, and if applicable the list 52, 54 of destinations, the user may preselect a destination and/or other information for the transaction request 106 via the GUI 98 before contacting the ATV device 34, 36 with the mobile device to create an authenticated transaction.

In another embodiment, the user may tap the tag first then select a destination and/or other information for the transaction request 106 on the automatically displayed GUI, then tap again to create an authenticated transaction. If the module is mandatory, the first tap does not create a transaction (e.g., if the user must select a destination). If the module is not mandatory, it may create a standard transaction. The standard transaction will be replaced by a user-selected transaction if the user selects a destination and/or other information for the transaction request 106 and taps again.

Case 2: In the case where the transaction application 44 in the mobile device 40 does not contain or otherwise have access to the complementary module 48, 50 and/or the list 52 or 54 of destinations of the desired service provider, the user may manually download the missing complementary module 48, 50, and/or the list of destinations 52, 54 and then proceed as for Case 1 above. The user may also tap first, then confirm the proposed downloading of the missing complementary module 48, 50, and/or the list of destinations 52, 54 and finally proceed as for Case 1 above. As in Case 1, the first tap may or not create a transaction depending on the mandatory state of the module.

If the service provider is new, the table 112 will be updated first to obtain the service provider's module/list information (and no transaction will be created on the first tap).

In public transport systems where the fare depends on the distance traveled, it is useful to be able to preselect a final destination just before validating, which avoids a mandatory validation on exit.

As described in U.S. Pub. No. 20140201066, in one embodiment, the exemplary ATV device 34 is not directly connected to the transaction server 30, but instead uses the passenger's mobile device 40 as a relay device to send the transaction data 38 to the transaction server 30, e.g., in an encrypted form. The ATV device 34 may be configured to send recent transaction data 38 for a set of passengers to the mobile device 40 that swipes the ATV device, to ensure that the transaction data 38 is received by the transaction server 30, even if one of the devices 40 is unable to send the information. Thus, for example, if one mobile device is out of range of the communication network, a later mobile device that swipes the ATV device is able to send the transaction data 38 that was unable to be transmitted earlier. The exemplary ATV device transceiver 60 includes a NFC emitter, which transmits the transaction data 38 to the corresponding receiver 62 on the mobile device 40. The mobile device sends the transaction data 38 to the server 30 via a suitable long-range (1 km or more) wireless network 92, such as a cellular network.

When users tap their smartphone on the ATV devices 34, 36, this creates secure transactions without a network coverage requirement for the ATV devices. Prior to making a transaction on the vehicle, each passenger using the mobile payment system registers and creates an account in the application server 42 and downloads a transaction application 44 to the user's mobile device 40. During registration, payment information may be provided to the server in the form of a credit card, debit account, or billing account. During setup of the application on the mobile device 40, a signed application certificate having a unique user identifier, a unique application transaction identifier, and a validity period are received from the server 42. The application is configured for sending the user identifier 46 to the ATV device 38 via near field communication. The ATV device incorporates the user identifier 46 into the transaction data 38 to be sent to the server. The application server 42 provides the transaction server with the user's payment information when provided with a valid user identifier.

Different types of ticket validation may be used on the vehicles 20, 22. Some systems are "check-in only", i.e., validation is performed only at boarding, providing a check-in location and check-in time (approximate boarding time), but providing no check-out (alighting) information. Other validation systems are "check-in/check-out", i.e., validation is performed at both boarding and alighting, providing a timestamp and location for each.

In an exemplary embodiment, the transaction server 30 manages transactions, post-payment and invoicing. It may also provide users with access to a trip planner that proposes itineraries, modalities, duration, carbon footprint and real time information, if available. The transactions are uploaded from the tag to the transaction server 30 through the smartphones, where each smartphone uploads several transactions, not only its own (thus, each transaction is uploaded several times). Such a system may be fully interoperable for the users within the affiliated transport networks on which the system operates. The transaction server may output transaction information, e.g., in the form of a bill or direct debit, for the passenger associated with the user identifier.

Each memory 70, 80, 140, 160 may represent any type of non-transitory computer readable medium such as random access memory (RAM), read only memory (ROM), magnetic disk or tape, optical disk, flash memory, or holographic memory. In one embodiment, the memory 70, 80, 140, 160 comprises a combination of random access memory and read only memory. Memory 70, 80, 140, 160 stores instructions for performing the exemplary method as well as the processed data.

The digital processor devices 74, 84, 144, 164 can be variously embodied, such as by a single-core processor, a dual-core processor (or more generally by a multiple-core processor), a digital processor and cooperating math coprocessor, a digital controller, or the like. Each digital processor 74, 84, 144, 164 executes respective software instructions 72, 82, 142, 162.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5A:
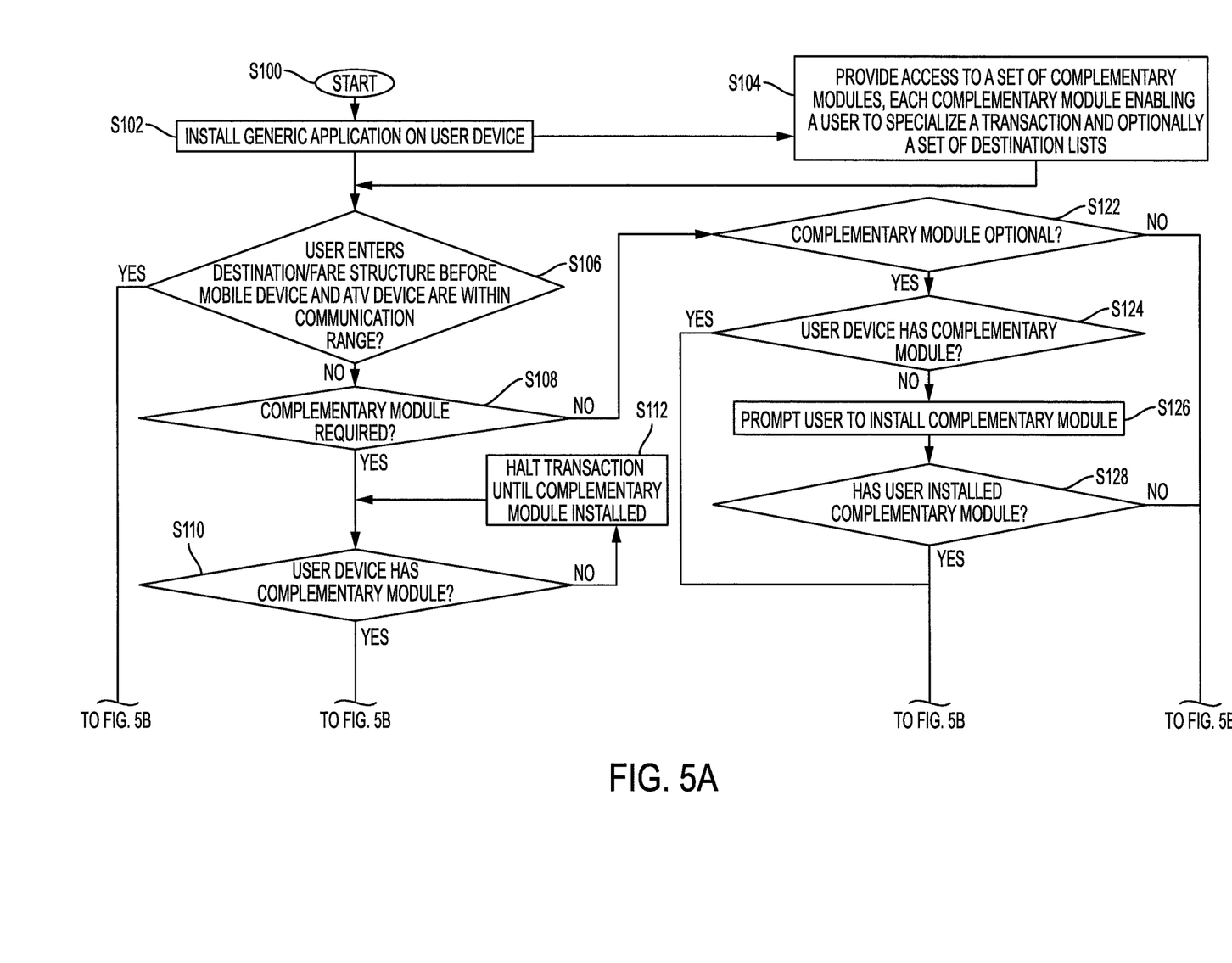
FIGS. 5A and 5B, is a flow chart illustrating a method for making a transaction in accordance with another aspect of the exemplary embodiment.
Figure 5B:
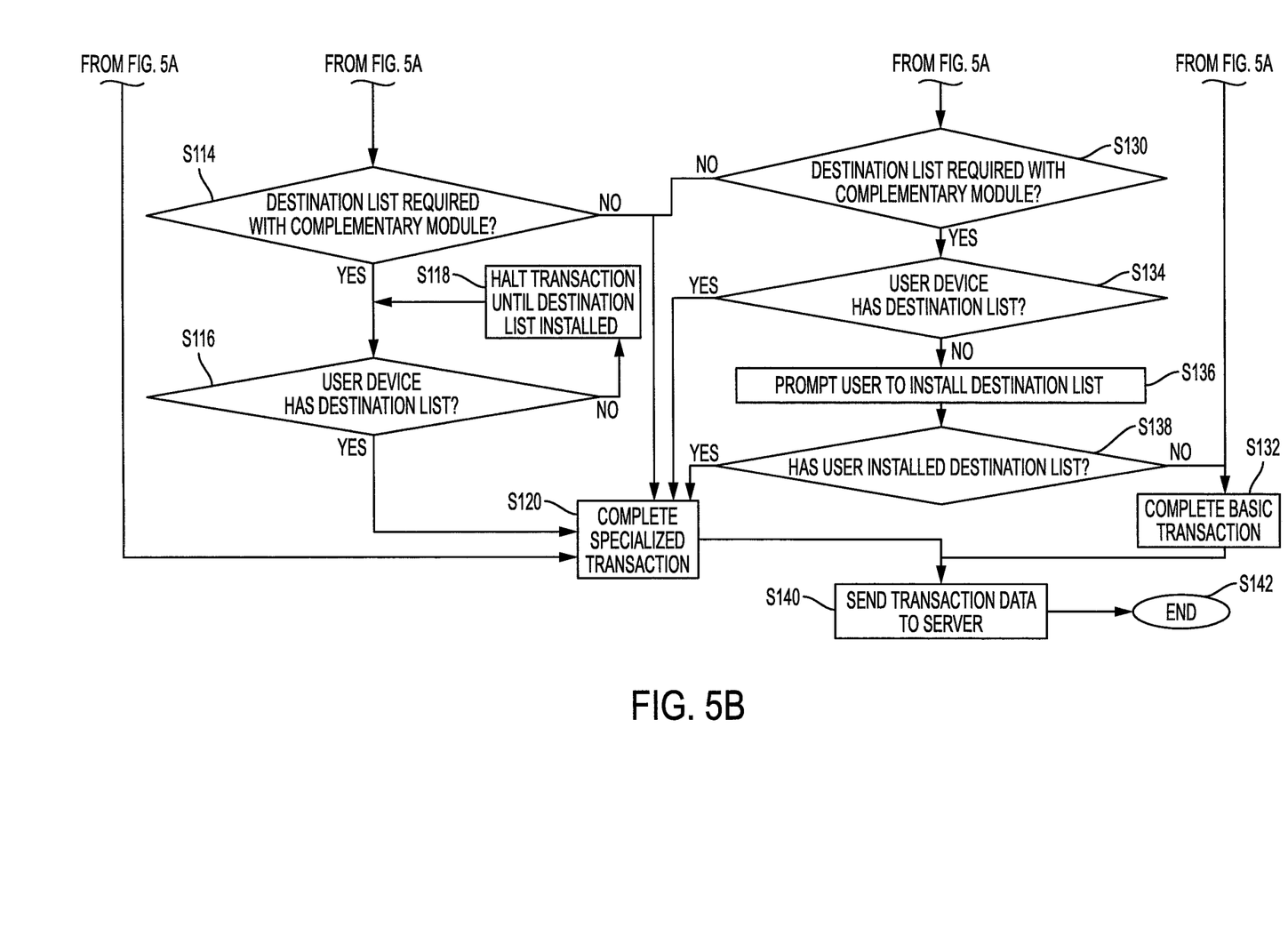

With reference to FIG. 5, which is split into FIGS. 5A and 5B, a method for enabling transactions on a transportation network is shown. The method begins at S100.

At S102, a user registers with the application server and downloads a transaction application 44 with a user identifier 46 to his or her mobile device 40.

At S104, access is provided to a set of one, two or more complementary modules 50, each complementary module enabling a user to specialize a transaction, and optionally a set of one, two or more destination lists 52 for use with one or more of the modules 50.

At S106, the mobile device 40 and ATV device 34 exchange information when brought within communication range to initialize a transaction, e.g. by tapping the mobile device on the ATV device. If the user already has a complementary module and, if needed, a destination list on the mobile device, the user may have selected a destination and/or fare structure before tapping, in which case the method may proceed directly to S120, and the transaction may thus be completed with a single tap. Otherwise, the method proceeds to S108.

If at S108, the transportation network/service provider requires a complementary module 50, a transaction is not permitted if the required module list is not on the user's device. If at S110, the user does not have the complementary module installed, at S112, the transaction is halted until that complementary module is installed. The transaction application may receive a message from the ATV device that the transaction cannot take place without a complementary module for the particular transportation network or may detect that no confirmation of the transaction has been received from the ATV device within a predefined time period. The transaction application may then cause a message to appear on the mobile device screen which alerts the user that the transaction cannot be processed without the complementary module specific to that transportation network and request that the user selects to download it. Alternatively, the transaction application may proceed to acquire the new module without alerting the user, based on identifying information provided by the ATV device, such as the network name or other identifying information 122. The transaction application accesses the table 112 and determines the identifier of the correct module from the table and sends a request to the application server which provides the identifier of the required module (or the identifier of the service). The application server receives the request from the mobile device 40 and provides the appropriate complementary module 48, 50, based on the module or service provider identifier provided.

If at S110, the user does have the complementary module installed, the method proceeds to S114.

If at S114, a destination list 52 is required for use with the complementary module, the method proceeds to S116, otherwise to S120.

If at S116, the destination list is not already installed on the user's device, the method proceeds to S118, where the transaction is halted until the appropriate destination list is installed. The user may be prompted to download the destination list in a similar manner to the complementary module. As will be appreciated, the module request 176 may specify the identifier of both the needed module and the needed destination list when both are needed and both may be downloaded at the same time.

If at S116, the destination list is installed on the user's device, the method proceeds to S120.

At S120, a transaction is conducted in which the user specializes the transaction by selecting variables of the transaction, such as destination and/or fare type and the information is received by the ATV device which checks them.

If at S108, a complementary module is not required, the method proceeds to S122.

If at S122, the complementary module is optional, the method proceeds to S124. Otherwise, it is assumed there is no complementary module available for this service provider and the method proceeds to S132, where a basic transaction is completed.

If at S124, the complementary module is not installed on the user's device, the method proceeds to S126, where the user is prompted to install the optional complementary module, as described for S110-S112.

If at S128, the complementary mode has been installed by the user, the method proceeds to S130, otherwise to S132, where a basic transaction is completed.

If at S124, the answer is yes, the method proceeds to S130.

If at S130, a destination list is required with the complementary module and is not currently on the user's device, the method proceeds to S134, otherwise to S120.

If at S134, the destination list is not installed on the user's device, the method proceeds to S136, where the user is prompted to install the relevant destination list on the user's device, otherwise to S120.

If at S138, the destination list is installed, the method proceeds to S120, as discussed above, otherwise to S132, where a basic transaction is completed.

At S140, the transaction data 38 generated by the ATV device 34, 36 is wirelessly communicated to the mobile device when the mobile device is again within near field communication range and is relayed by the mobile device 40 (and/or by other mobile devices making transactions with the ATV device) to the transaction server 30 where it is deciphered. The transaction data may be relayed by the user's mobile device shortly after the transaction is completed, if the user's mobile device is connected to the Internet, or may be relayed later, when the user's mobile device is in wireless communication. For example, the user may deactivate the communication to the server (e.g., for cost reasons), use many different services during the day, then connect by WiFi at night to download all transactions collected from tags of different providers.

The data 38 may be used for completing a transaction with the passenger, e.g., for billing the passenger. The data may also be used for generating statistics on passenger travel in the transportation network. See, for example, U.S. Pub. Nos. 20130185324, 20130317742, 20130317747, 20130317884, and 20140089036, and U.S. application. Ser. No. 14/737,964 for descriptions of how such data can be employed in understanding passenger behaviors and making suggestions based thereon. Transaction data 38 may be received from more than one automatic ticketing validation devices transported by different transportation vehicles traveling on routes of a transportation network (for example, two sets of data may be used where a passenger makes a connection within a permitted time period).

The method ends at S142.

At least a part of the method illustrated in FIGS. 5A and 5B may be implemented in a computer program product or products that may be executed on a computer or set of computers, such as one or more of devices 34, 36, 40, 42, 30. The computer program product(s) may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with a computer (for example, an internal hard drive of RAM), or may be separate (for example, an external hard drive operatively connected with the computer), or may be separate and accessed via a digital data network such as a local area network (LAN) or the Internet (for example, as a redundant array of inexpensive of independent disks (RAID) or other network server storage that is indirectly accessed by the computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 5A and 5B can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for enabling transactions on a plurality of associated transportation networks delivering services to users, comprising:

communicating a transaction application and a respective user identifier to at least one mobile communication device via a wireless connection, the transaction application permitting a user of the mobile communication device to make transactions on one or more associated transportation networks, but only for a basic subset of transactions which are generic to some or all of the transportation networks;

storing a set of complementary modules remote from the mobile communication device, each complementary module enabling a user with a transaction application and user identifier on a respective one of the mobile communication devices to specialize a transaction on at least one of the associated transaction networks by selecting at least one variable of the transaction when the complementary module has been loaded on the user's mobile communication device; after communicating the transaction application, determining whether a selected one of the associated transportation networks requires a complementary module for making a transaction which is not among the basic subset of transactions provided for by the transaction application;

and determining that the complementary module is required and is not loaded on an associated user's mobile communication device, providing the respective one of the set of complementary modules to the user's mobile communication device for specializing a transaction, which is not among the basic subset of transactions provided for by the transaction application, on the selected one of the associated transportation networks, in cooperation with the communicated transaction application.

2. The method of claim 1, further comprising providing a second of the set of complementary modules to at least one of the same user's mobile communication device and another user's mobile communication device for specializing a transaction on another selected one of the associated networks, the second complementary module providing for different variables to be selected from the first complementary module.

3. The method of claim 1, wherein a first of the associated networks specifies use of a first of the complementary modules for at least some transactions and a second of the associated networks specifies use of a second of the complementary modules for at least some transactions, each of the complementary modules providing for different variables to be selected.

4. The method of claim 1, wherein the networks are transportation networks and the transaction includes obtaining a service on the selected one of the transportation networks.

5. The method of claim 4, wherein the specializing includes selecting at least one of a destination and a fare structure for the service.

6. The method of claim 1, wherein the specializing of the transaction comprises communicating the user identifier and selected at least one variable to a tag of the associated network when the mobile communication device is within communication range of the tag.

7. The method of claim 6, wherein the tag communicates with the mobile communication device by at least one of near field communication and Bluetooth Low Energy communication.

8. The method of claim 6, wherein the transaction application on the mobile communication device includes instructions for relaying transaction data for a plurality of transactions, conducted by the tag with a plurality of mobile communication devices, from the tag to a transaction server for computing a payment for each transaction.

9. The method of claim 1, wherein the at least one variable includes a destination and the method further comprises providing one of a set of destination lists to the user's mobile communication device for specializing the transaction by selecting a destination on the selected one of the associated networks.

10. The method of claim 9, wherein the transaction application generates a graphical user interface of the mobile communication device for selecting a destination form the destination list.

11. The method of claim 1, wherein the at least one variable includes a fare structure.

12. The method of claim 11, wherein the fare structure is selected from a student fare structure, a multi-person fare structure, an age-related fare structure, a time-dependent fare structure, and combinations thereof.

13. The method of claim 1, further comprising receiving a request from the user's mobile communication device for the providing of the one of the set of complementary modules.

14. The method of claim 13, wherein the transaction application includes, for each of a set of the associated transaction networks, an identifier for the respective complementary module, and wherein the request for the providing of the one of the set of complementary modules includes the identifier for the respective complementary module.

15. The method of claim 1, wherein the transaction application includes instructions for generating a graphical user interface based on information in the complementary module which enables the user to specialize the transaction.

16. A system for enabling transactions on a plurality of associated networks delivering services to users, comprising:
a registration component for communicating a transaction application and a respective user identifier to mobile communication devices via a wireless connection, the transaction application enabling users to conduct transactions for services on the networks, but only for a basic subset of transactions which are generic to some or all of the transportation networks, at least one of the networks being associated with a complementary module for specializing transactions on the network that are not among the basic subset of transactions, the transaction application comprising a requirements identifier configured to determine whether a selected one of the associated networks requires a complementary module;
memory, which stores a set of the complementary modules, each complementary module enabling a user with a transaction application and user identifier already on a respective one of the mobile communication devices to specialize a transaction, which is not among the basic subset of transactions, on a respective one of the associated networks by selecting at least one variable of the transaction;
a complementary module provider which provides one of the set of complementary modules to the user's mobile communication device for specializing a transaction on a user-selected one of the associated networks when the requirements identifier on the user's mobile device determines that a complementary module is required and is not loaded on the user's mobile communication device; and
a processor which implements the registration component and complementary module provider.

17. The system of claim 16, wherein the memory stores a plurality of different destination lists, the complementary module provider providing one of the plurality of complementary modules and a respective one of the destination lists to the user's mobile communication device for specializing a destination from that destination list in the transaction on the user-selected one of the associated networks.

18. A method for specializing a transaction for delivering a service to a user with a mobile communication device, comprising:
communicating a transaction application to at least one mobile communication device via a wireless connection, the transaction application permitting a user of the mobile communication device to make transactions on one or more associated transportation networks, but only for a subset of transactions which are generic to some or all of the transportation networks;
after communicating the transaction application to the mobile communication device, with the transaction application, determining that a service provider of a transportation service is associated with a complementary module that is not stored on the mobile communication device, the complementary module cooperating with the transaction application to provide a graphical user interface on the mobile communication device for selecting variables of a transaction which is not among the basic subset of transactions provided for by the transaction application;
downloading the complementary module onto the mobile communication device via a wireless connection;
with the transaction application, generating a graphical user interface which enables a user to specialize a transaction by selection from a set of variables provided by the complementary module;

when the mobile communication device is within communication range of an automatic ticketing validation device on a transportation vehicle, receiving validation data for the transaction from the automatic ticketing validation device; and relaying the validation data from mobile communication device to a transaction server to specialize the transaction based on the selection from the set of variables.

19. The method of claim 18, wherein the determining is performed after the mobile communication device is within communication range of the automatic ticketing validation device at a first time and the validation data for the transaction from the automatic ticketing validation device is received when the mobile communication device is within communication range of the automatic ticketing validation device at a second time after the first time.

20. The method of claim 1, wherein each of the at least one mobile communication device is a smartphone which includes a display device and wherein the transaction application includes a graphical user interface generator for generating a respective graphical user interface on the display device, the method comprising, with the graphical user interface generator of the transaction application, in cooperation with the complementary module, generating a graphical user interface which is applicable to the transportation network associated with the complementary module.

21. The method of claim 18, wherein the complementary module specializes transactions on the network other than the basic subset of transactions.

* * * * *